United States Patent
Hofmann et al.

(10) Patent No.: US 10,534,880 B2
(45) Date of Patent: Jan. 14, 2020

(54) ACCELERATION OF VOLTAGE PROPAGATION BASED ON LOCAL ITERATION

(71) Applicant: Mentor Graphics Corporation, Wilsonville, OR (US)

(72) Inventors: Mark E. Hofmann, Portland, OR (US); Sridhar Srinivasan, Tualatin, OR (US); Gregory P. Hackney, West Linn, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 366 days.

(21) Appl. No.: 15/239,720

(22) Filed: Aug. 17, 2016

(65) Prior Publication Data

US 2018/0052950 A1    Feb. 22, 2018

(51) Int. Cl.
*G06F 17/50* (2006.01)

(52) U.S. Cl.
CPC ................. *G06F 17/5036* (2013.01)

(58) Field of Classification Search
CPC ................. G06F 17/5009; G06F 17/5045
See application file for complete search history.

(56) References Cited

U.S. PATENT DOCUMENTS

| | | | |
|---|---|---|---|
| 9,129,078 B1 * | 9/2015 | Keller | G06F 17/5036 |
| 9,189,582 B2 | 11/2015 | Srinivasan et al. | |
| 2010/0169064 A1 * | 7/2010 | Boselli | G06F 17/5036 703/14 |
| 2011/0055785 A1 * | 3/2011 | Chakanakar | G06F 17/5072 716/126 |

OTHER PUBLICATIONS

Tseng, Yuan-Hung et al., "Pulsing Electrical Over-Stress (EOS) Testing and Its Failure Analysis for Advanced Process Integrated Circuits," IEEE International Symposium on the Physical and Failure Analysis of Integrated Circuits (IPFA), pp. 607-610 (2013) (Year: 2013).*
Gielen, Georges G. E., et al., "Computer-Aided Design of Analog and Mixed-Signal Integrated Circuits," Proceedings of the IEEE, vol. 88, No. 12, pp. 1825-1852 (2000) (Year: 2000).*
M. Hogan, et al., "Using Static Voltage Analysis and Voltage-Aware DRC to Identify EOS and Oxide Breakdown Reliability Issues", Electrical Overstress/Electrostatic Discharge Symposium (EOS/ESD), 2013 35th, Las Vegas, Sep. 10-12, 2013, IEEE.

(Continued)

*Primary Examiner* — Rehana Perveen
*Assistant Examiner* — Steven W Crabb

(57) ABSTRACT

Aspects of the disclosed technology relate to techniques of voltage propagation-based reliability verification. Voltage values are propagated across components of a circuit design through global iterations until voltage values on nets of the circuit design are not changed from one global iteration to a next global iteration or one preset condition is met. At least one of the global iterations comprises local iterations for a subcircuit of the circuit design. The local iterations suspend when voltage values on nets of the subcircuit are not changed from one local iteration to a next local iteration or one preset condition is met. The propagated voltage values are then analyzed to detect problems in the circuit design.

17 Claims, 7 Drawing Sheets

(56) References Cited

OTHER PUBLICATIONS

Lescot, J., et.al. "Static Low Power Verification at Transistor Level for SoC Design," International Symposium on Low Power Electronics and Design (ISLPED) 2012, Jul. 2012.

Dina Medhat, "Electrical Overstress Detection and Debugging", EETimes, Aug. 19, 2015.

Dina Medtat, "Reliability approaches for automotive electronic systems", in "Reliability Characterisation of Electrical and Electronic Systems", ed. by J. Swingler, 1st Edition, ElSevier (Woodhead Publishing), 2015.

* cited by examiner

ACCELERATION OF VOLTAGE PROPAGATION BASED ON LOCAL ITERATION

FIELD OF THE DISCLOSED TECHNOLOGY

The present disclosed technology relates to integrated circuit design and process technologies. Various implementations of the disclosed technology may be particularly useful for reliability verification of a circuit design.

BACKGROUND OF THE DISCLOSED TECHNOLOGY

Many power-efficient circuit designs today have multiple voltage domains. Device electrical overstress occurs when a low-voltage device is driven by a high-voltage power rail, signal, or bulk connection with the potential to cause long-term or permanent damage (usually in the form of oxide breakdown). This damage results in circuit degradation or failure over time. Conversely, when insufficient voltage is applied to a high-voltage device and the device is driven by a low-voltage net, the device may not switch, or may switch slowly, again degrading circuit performance.

Thin-oxide transistors, used extensively at advanced nodes, are less robust against electrical failure and impose new electrical overstress verification challenges. Thinner oxide generally allows for the use of lower voltage and provides less power. When power domain design errors occur, effects such as negative bias temperature instability (NBTI) can lead to the threshold voltage of the PMOS transistors increasing over time, resulting in reduced switching speeds for logic gates, and hot carrier injection (HCI) issues, altering the threshold voltage of NMOS devices over time. Soft breakdown (SBD), as a time-dependent failure mechanism, also contributes to the degradation effects of gate oxide breakdown.

Electrical overstress is an important concern for both analog and digital designers, due to the variety of power conditions commonly used in all designs, such as multiple power domains, standby/wake-up/low power/power-down conditions (in which there is no bias current, but the battery is present), and the presence of high-voltage signals. Understanding device pin voltages in all modes of operation is thus critical for detecting potential electrical overstress issues. The ability to identify device breakdown, recognize reverse breakdown issues in high-voltage areas, and detect maximum voltage across gate oxides are all part of a robust electrical overstress detection strategy. However, verifying device operating voltage conditions in voltage-controlled designs is very complicated.

Many design teams employ SPICE simulations and user-generated marker layers or text points to check for electrical overstress, but this is an error-prone method because it requires the designer to manually determine how voltages propagate throughout the design, and manually mark the correct regions for high-voltage design rules. Markers are also extremely difficult to maintain as the design is changed.

With consumer expectations for longer device operation at sustained performance levels, designing for reliability is no longer an optional product feature, but a necessary and integral part of a product's specifications. Designers need verification tools and techniques that go beyond the traditional triumvirate of design rule checking (DRC), layout vs. schematic (LVS) comparison, and electrical rule checking (ERC) to provide thorough detection of and protection against electrical overstress conditions.

BRIEF SUMMARY OF THE DISCLOSED TECHNOLOGY

Aspects of the disclosed technology relate to techniques of voltage propagation-based reliability verification. In one aspect, there is a method comprising: propagating voltage values across components of a circuit design through global iterations until voltage values on nets of the circuit design are not changed from one global iteration to a next global iteration or one preset condition is met, a net being a conductor interconnecting two or more terminals of components of the circuit design, wherein at least one of the global iterations comprises local iterations for a subcircuit of the circuit design, the local iterations suspending when voltage values on nets of the subcircuit are not changed from one local iteration to a next local iteration or one preset condition is met; analyzing the propagated voltage values to detect problems in the circuit design; and reporting the detected problems in the circuit design.

The local iterations may be performed for predetermined subcircuits of the circuit design or all subcircuits of the circuit design. The detected problems in the circuit design may comprise electrical overstress. The reporting may comprise storing and/or displaying information of the detected problems.

The propagating may be performed in a vectorless mode. In the vectorless mode, only voltages values for nets connected to power supply and ground rails are defined. One of the rules for the vectorless mode assumes transistors are "on" by default. Users may specify one or more transistors being "off".

The circuit design may be in a hierarchical expression. Each of the global iterations may comprise propagating voltage values up and down the circuit hierarchy and the subcircuit may be one of a root cell, leaf cells and/or composition cells.

In another aspect, there is one or more computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

Figure 1:
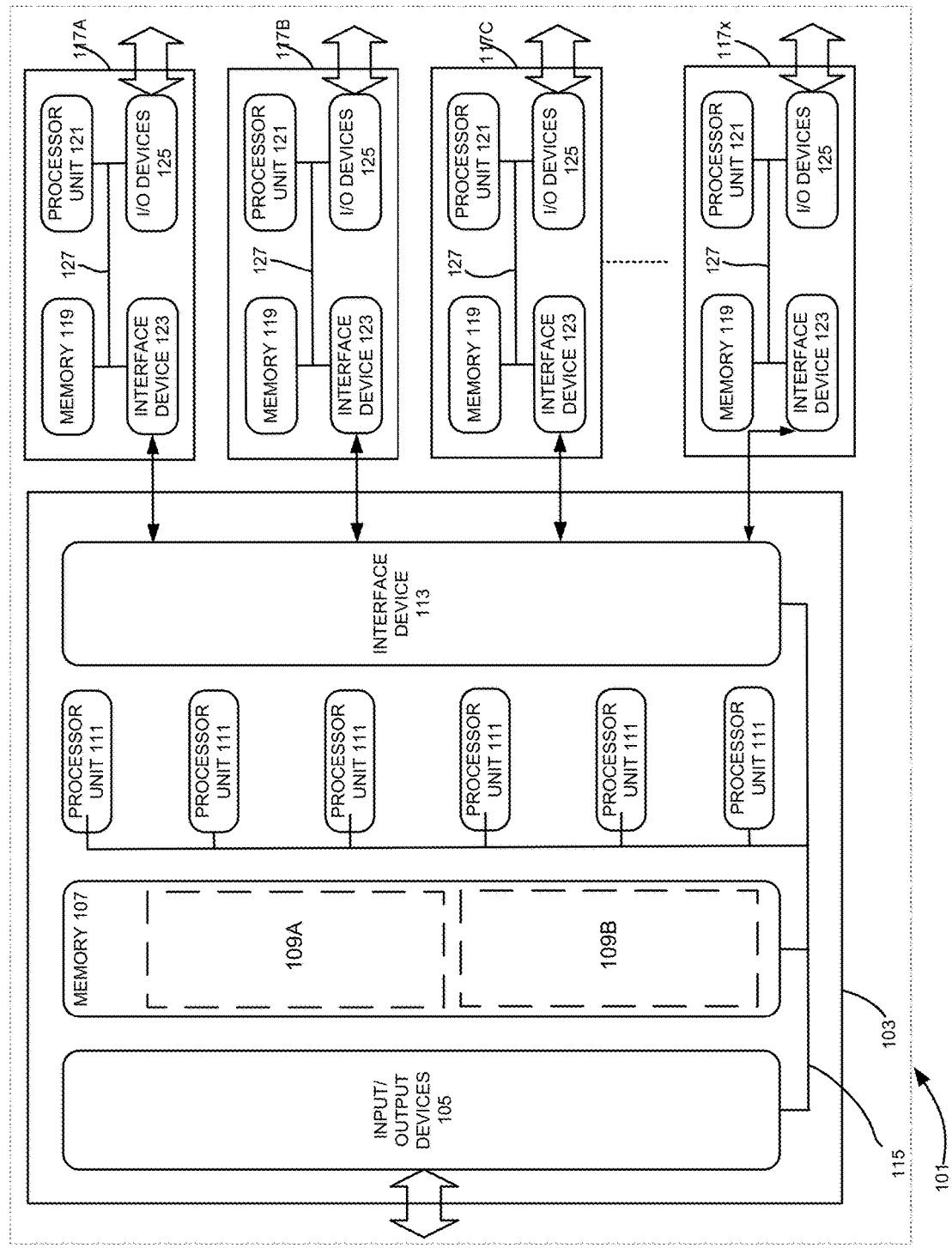
FIG. 1 illustrates an example of a computing system that may be used to implement various embodiments of the disclosed technology.

Various aspects of the present disclosed technology relate to techniques of voltage propagation. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "propagate", "analyze", and "report" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool. Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, the term "design" is intended to encompass data describing an entire microdevice, such as an integrated circuit device or micro-electromechanical system (MEMS) device. This term also is intended to encompass a smaller group of data describing one or more components of an entire microdevice, however, such as a layer of an integrated circuit device, or even a portion of a layer of an integrated circuit device.

Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
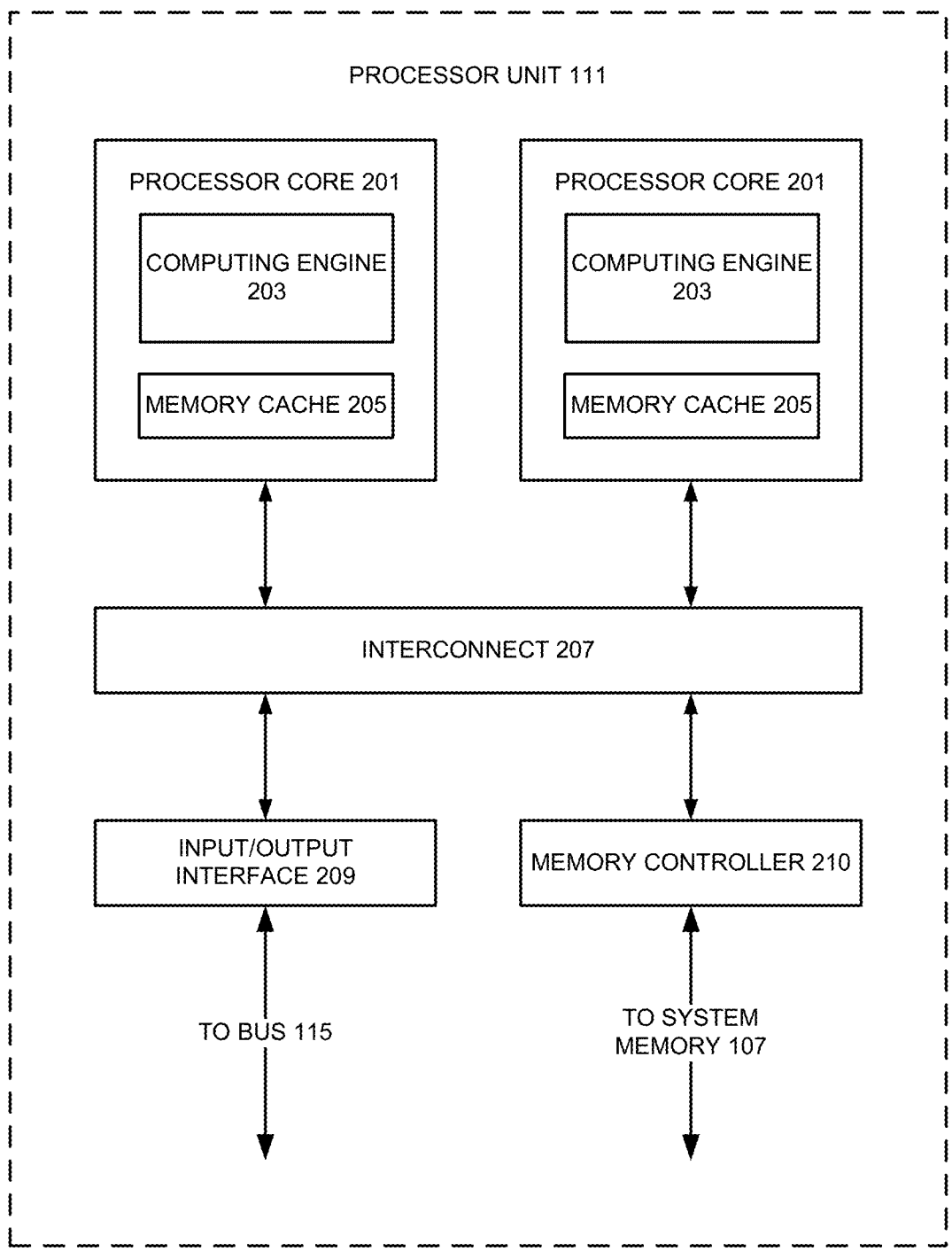
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Design Flow And Reliability Verification

Electronic circuits, such as integrated microcircuits, are used in a variety of products, from automobiles to microwaves to personal computers. Designing and fabricating integrated circuit devices typically involves many steps, sometimes referred to as a "design flow." The particular steps of a design flow often are dependent upon the type of integrated circuit, its complexity, the design team, and the integrated circuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing circuit device components (e.g., contacts, channels, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

Integrated circuit layout descriptions can be provided in many different formats. The Graphic Data System II (GDSII) format is a popular format for transferring and archiving two-dimensional graphical IC layout data. Among other features, it contains a hierarchy of structures, each structure containing layout elements (e.g., polygons, paths or polylines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in IC layout designs that are employed to manufacture integrated circuits. Once the microcircuit device design is finalized, the layout portion of the design can be used by fabrication tools to manufacture the device using a photolithographic process.

Process variations and technical limitations of the photolithography techniques can make it difficult or even impossible to print some layout features. To achieve a high overall yield and reliability for the design, the layout is measured by a set of geometric constraints, or design rules, specific to a particular photolithographic process before tapeout. Design rule checking is thus a major step during physical verification signoff on the design. Still further, the layout design may be modified to include the use of redundant geometric elements or the addition of corrective features to various geometric elements, to counteract limitations in the manufacturing process, etc. For example, the design flow process may include one or more resolution enhancement technique (RET) processes (e.g., optical proximity correction), that modify the layout design data to improve the usable resolution of the reticle or mask created from the design in a photolithographic manufacturing process.

Circuit designs and layout designs are also reviewed for reliability issues caused by the electrical system. This is sometimes referred to as reliability verification. Reliability verification can include reviewing the design for protection from electrostatic discharge (ESD) events, detecting electrical overstress (EOS) situations, performing voltage-aware design rule checking (VDRC), or the like. Tools that can detect electrical overstress situations and perform voltage-aware design rule checking, often do so in a two-stage process—performing voltage propagation through the design, for example, at the schematic-level, and then comparing particular circuits in the design and their corresponding propagated voltages to various electric rules or design rules. Since reliability verification is typically performed without design simulation, i.e., without an understanding of electrical performance of the devices in the design, the tools often propagate a common voltage throughout the design, perform rule checking based on that common voltage, and determine a presence of electrical violations.

Reliability Verification Tool

Figure 3:
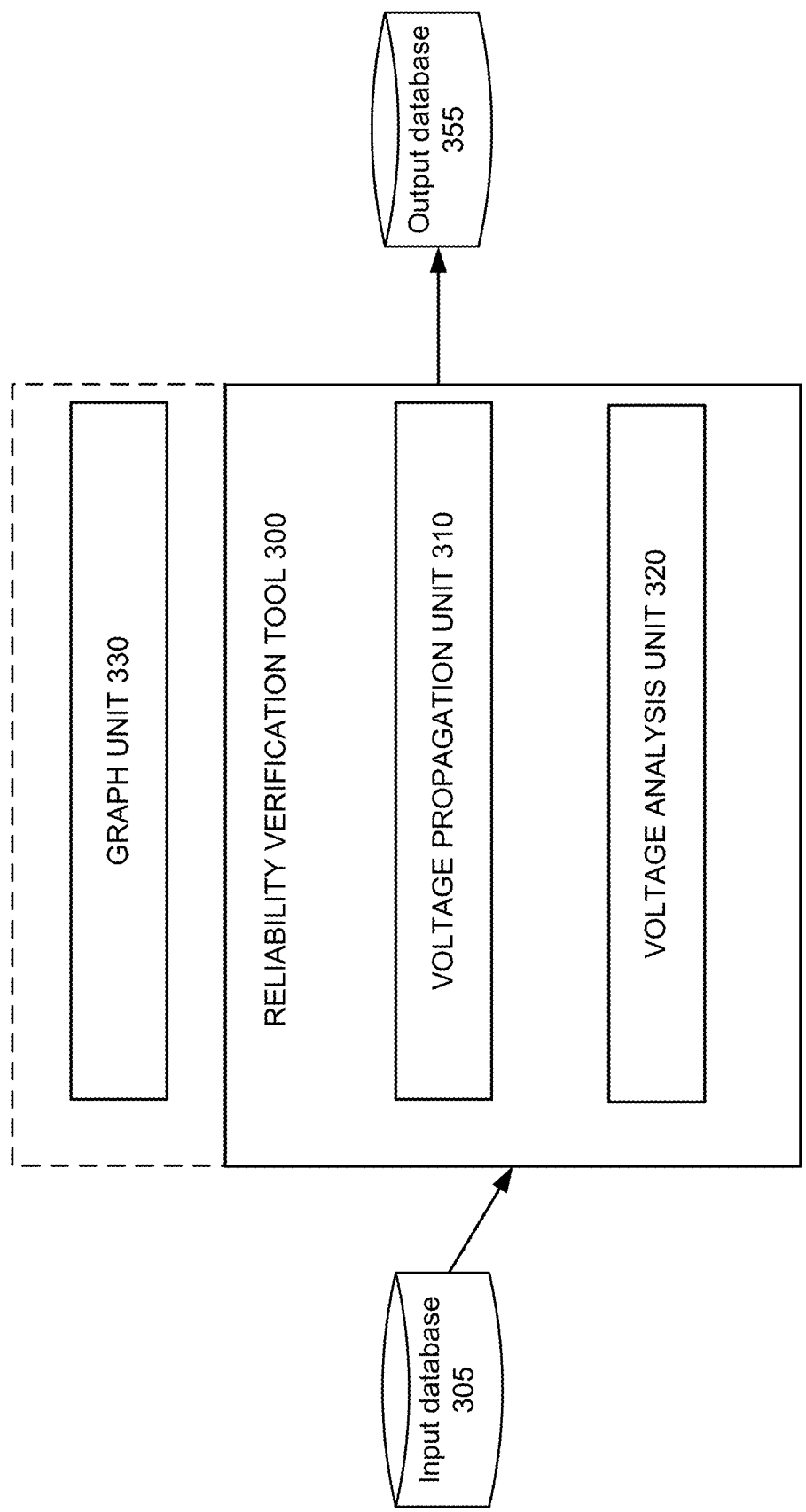
FIG. 3 illustrates an example of a reliability verification tool that may be implemented according to various embodiments of the disclosed technology.

FIG. 3 illustrates an example of a reliability verification tool 300 that may be implemented according to various embodiments of the disclosed technology. As seen in this figure, the reliability verification tool 300 includes a voltage propagation unit 310 and a voltage analysis unit 320. Some implementations of the reliability verification tool 300 may cooperate with (or incorporate) one or more of a graph unit 330, an input database 305 and an output database 355.

As will be discussed in more detail below, the reliability verification tool 300 can receive a circuit design from the input database 305. The voltage propagation unit 310 can propagate voltage values across components of a circuit design through global iterations until voltage values on nets of the circuit design are not changed from one global iteration to the next global iteration or one preset condition is met. At least one of the global iterations comprises local iterations for a subcircuit of the circuit design. The local iterations terminate when voltage values on nets of the subcircuit are not changed from one local iteration to a next local iteration or one preset condition is met. The voltage analysis unit 320 can analyze the propagated voltage values to detect problems in the circuit design. The reliability verification tool 300 can report the detected problems in the circuit design. The reporting may comprise storing in the output database 355 and/or displaying by the graph unit 330, information about the detected problems.

As previously noted, various examples of the disclosed technology may be implemented by one or more computing systems, such as the computing system illustrated in FIGS. 1 and 2. Accordingly, one or more of the voltage propagation unit 310, the voltage analysis unit 320 and the graph unit 330 may be implemented by executing programming instructions on one or more processors in one or more computing systems, such as the computing system illustrated in FIGS. 1 and 2. Correspondingly, some other embodiments of the disclosed technology may be implemented by software instructions, stored on a non-transitory computer-readable medium, for instructing one or more programmable computers/computer systems to perform the functions of one or more of the voltage propagation unit 310, the voltage analysis unit 320 and the graph unit 330. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the voltage propagation unit 310, the voltage analysis unit 320 and the graph unit 330 are shown as separate units in FIG. 3, a single computer (or a single processor within a master computer) or a single computer system may be used to implement all of these units at different times, or components of these units at different times.

With various examples of the disclosed technology, the input database 305 and the output database 355 may be implemented using any suitable computer readable storage device. That is, either of the input database 305 and the output database 355 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 305 and the output database 355 are shown as separate units in FIG. 3, a single data storage medium may be used to implement some or all of these databases.

Voltage-Propagation-Based Reliability Verification

Figure 4:
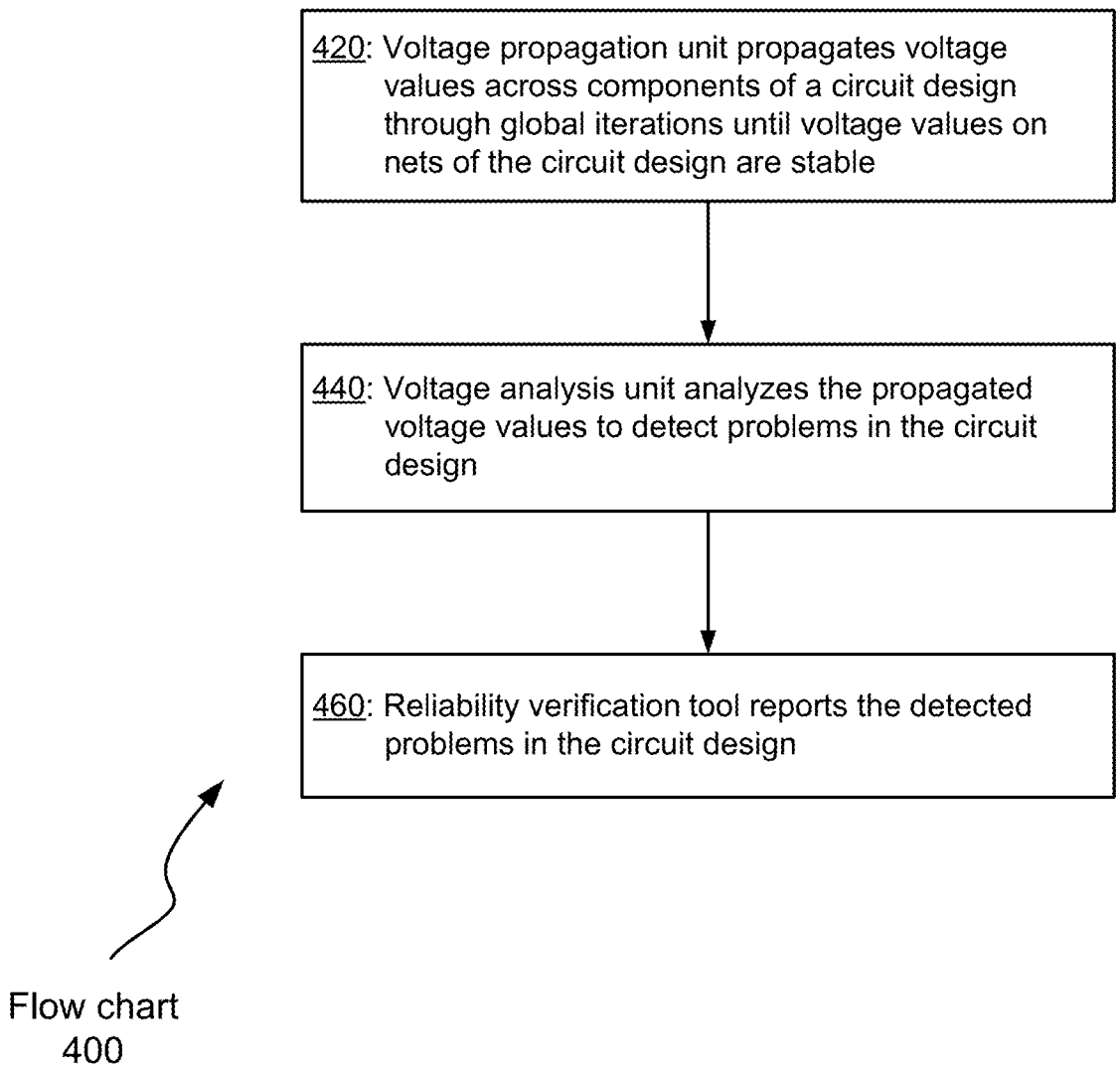
FIG. 4 illustrates a flowchart 400 showing a process of voltage propagation-based reliability verification that may be implemented according to various examples of the disclosed technology.

FIG. 4 illustrates a flowchart 400 showing a process of reliability verification that may be implemented according to various examples of the disclosed technology. For ease of understanding, methods of reliability verification that may be employed according to various embodiments of the disclosed technology will be described with reference to the reliability verification tool 300 in FIG. 3 and the flow chart 400 illustrated in FIG. 4. It should be appreciated, however, that alternate implementations of a reliability verification tool 300 may be used to perform the methods of reliability verification illustrated by the flow chart 400 according to various embodiments of the disclosed technology. Likewise, the reliability verification tool 300 may be employed to perform other methods of reliability verification according to various embodiments of the disclosed technology.

In operation 420, the voltage propagation unit 310 propagates voltage values across components of a circuit design through global iterations until voltage values on nets of the circuit design are not changed from one global iteration to a next global iteration or one preset condition is met. One example of the one or more preset conditions may be a maximum number of the global iterations being reached. The circuit design can describe components, such as resistors, transistors, or the like, and the connectivity of those components in an electronic device. A net is a conductor interconnecting two or more terminals of components of the circuit design.

The voltage propagation unit 310 can propagate voltage values based on predefined conduction rules in a vectored mode (circuit input states provided), a vectorless mode (only power/ground rails provided), or a hybrid mode. In a vectorless mode, for example, n-type and p-type channels may be assumed to be turned on and voltage values are propagated directly across the channels. In some cases, voltage values can only be propagated across n-type and p-type channels in one direction (e.g., from one side connected directly to a power or ground rail to the other side). Nets connected to power supply or ground rails are an example of breaking nets (i.e., nets to which voltage values are not propagated). Other components like inductors or resistors may be treated as short connections while diodes and capacitors may be considered as open circuits. These rules may be set as default rules for vectorless voltage propagation. Users may provide rules for particular components of the circuit design. For example, users may specify that certain transistors should be assumed to be in an "off" state during the voltage propagation process.

Figure 6:
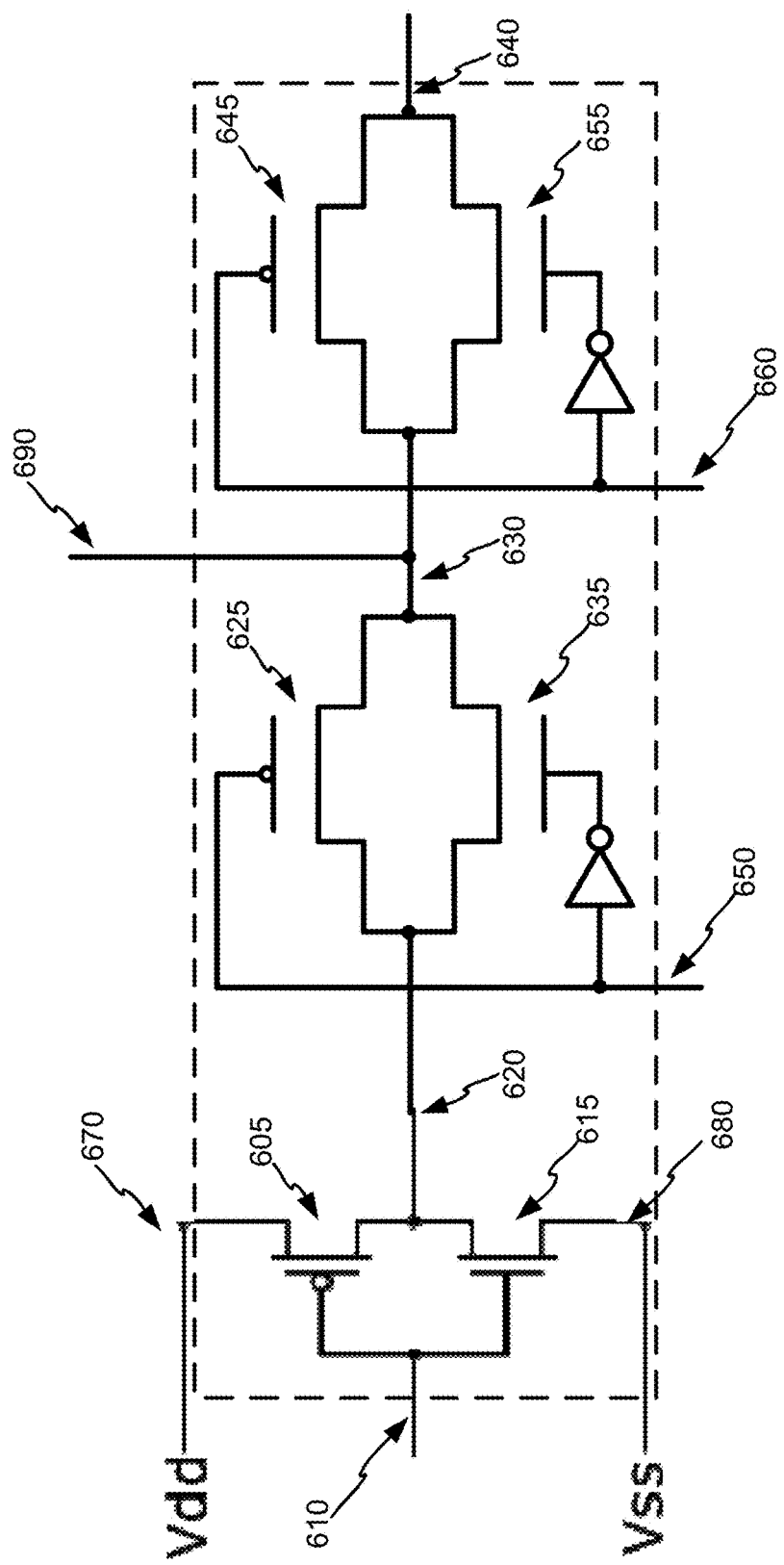
FIG. 6 shows an example of a circuit design 600 for illustrating how the voltage propagation operates according to some embodiments of the disclosed technology.

The voltage propagation typically needs to be performed for multiple iterations before voltage values on nets of the circuit design become stable, which is explained with respect to an example of a circuit design 600 shown in FIG. 6. The circuit design 600 includes an inverter and two transmission gates. The inverter includes two transistors 605 and 615; the first transmission gate includes two transistors 625 and 635; and the second transmission gate includes two transistors 645 and 655. Ports 610 and 640 are the input and output of the circuit design, respectively. Ports 670 and 680 are connected to the power supply and ground rails, respectively. Ports 650 and 660 are for control signal inputs of the two transmission gates, respectively.

The number of iterations of voltage propagation required before voltage values on nets of the circuit design 600 where voltage values could be propagated are stable (i.e., no changes between two consecutive iterations) depends, at least in part, upon the sequence of components of the circuit design 600 being considered. If the transistors 605 and 615 connected to the power/ground rails are considered first, voltage values on the net 620 will become known. If the transistors 625 and/or 635 are considered next, voltage values on the net 630 will become known. Finally, after the transistors 645 and/or 655 are considered, voltage values on the net 640 will become known. For this sequence, therefore, one iteration of voltage propagation is sufficient to make the voltage values on all of the nets stable because the next iteration will not change any of the propagated voltages.

If either of the two transmission gates is considered first, however, at least two iterations of voltage propagation are needed to propagate voltages to all of the nets. For example, if the transistors 625 and 635 are considered first, voltage values on neither of the two nets 620 and 630 are known. After all of the transistors are analyzed once, only voltage values on the net 620 become known. At least one more iteration is needed to propagate the voltage values on the net 620 to the nets 630 and 640. Accordingly, voltage values on the nets of the circuit design 600 are unstable after one such iteration.

The circuit design 600 is a relatively simple circuit design. For a more complex circuit design, it is impractical for a computer to find a voltage propagation path such that one iteration is sufficient. It should be noted that at least two iterations are normally needed for a voltage propagation process because it will not terminate until voltage values on the nets become stable or a predefined condition is met. The former is decided by checking whether or not the voltage values change from one iteration to the next. The latter is usually satisfied after multiple iterations.

If the circuit design 600 is a subcircuit of a larger circuit design, voltage values will probably not be stable with respect to not only the larger circuit design but also the subcircuit 600 after one global iteration of voltage propagation (i.e., all eligible components of the larger circuit design are considered once). With various implementations of the disclosed technology, the voltage propagation unit 310 will conduct iterations of voltage propagation for the subcircuit 600 (referred to as local iterations) within an iteration of voltage propagation for the larger circuit design (referred to as global iterations). The local iterations suspend when voltage values on nets of the subcircuit 600 are not changed from one local iteration to the next local iteration or one preset condition is met. In the next global iteration, the voltage propagation unit 310 may conduct the local iterations again. This is needed when, for example, one or more voltage values different from the ones derived from the previous local iterations appear at a port 690 after the previous global iteration is completed.

While inserting local iterations into a global iteration may slow down the global iteration, the total number of the global iterations can be greatly reduced. As a result, the whole voltage propagation process will be accelerated. Some experiments have shown a reduction of processing time at least by half. In various embodiments, the reliability verification tool 300 may allow users to specify directly/indirectly on which subcircuits to conduct local iterations and/or in which global iterations to include local iterations.

The circuit design may be represented by a flat description or a hierarchical description. In the hierarchical description, the circuit design is viewed as a collection of component aggregates that are further divided into sub-aggregates in a recursive and hierarchical manner. These hierarchical units are commonly referred to as cells (or modules, blocks, macros, and so on); the use of a cell at a given level of hierarchy is called a cell instance. The use of a cell at some point in a circuit implies that the entire content of the cell's definition is present at that point in the final circuit. Multiple uses of a cell indicate that the cell contents are to be repeated at each use.

Figure 5:
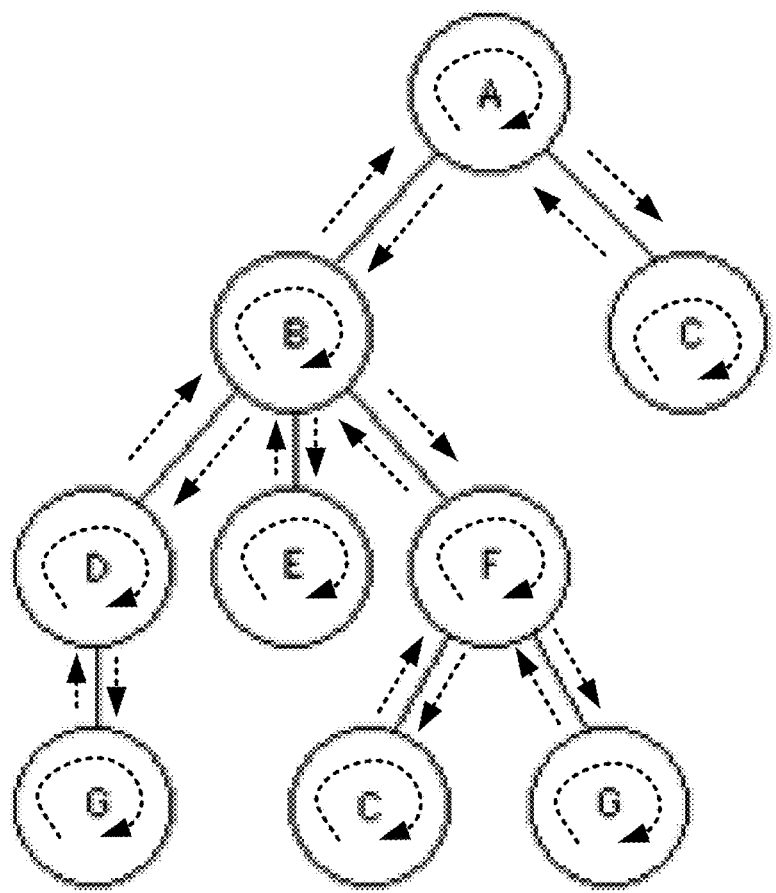
FIG. 5 illustrates an example of a hierarchical structure of a circuit design.
Figure 5:
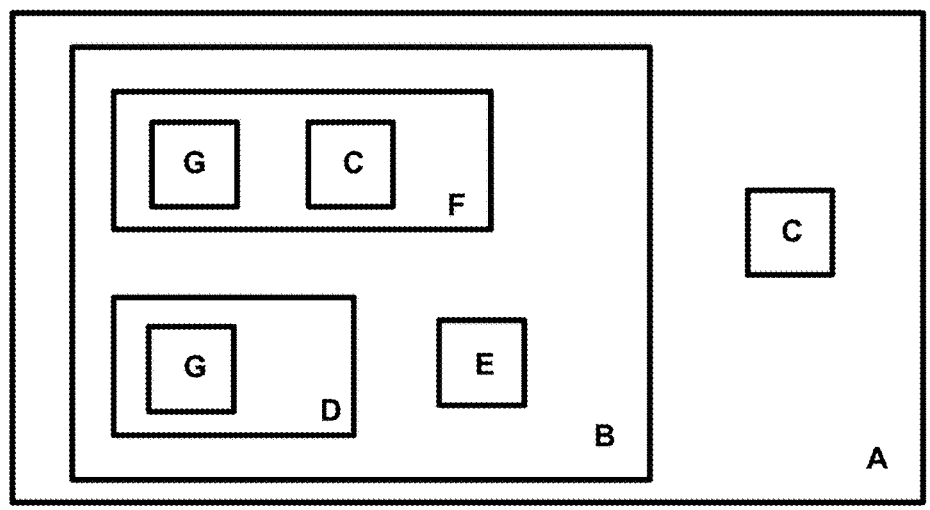
Figure 7:
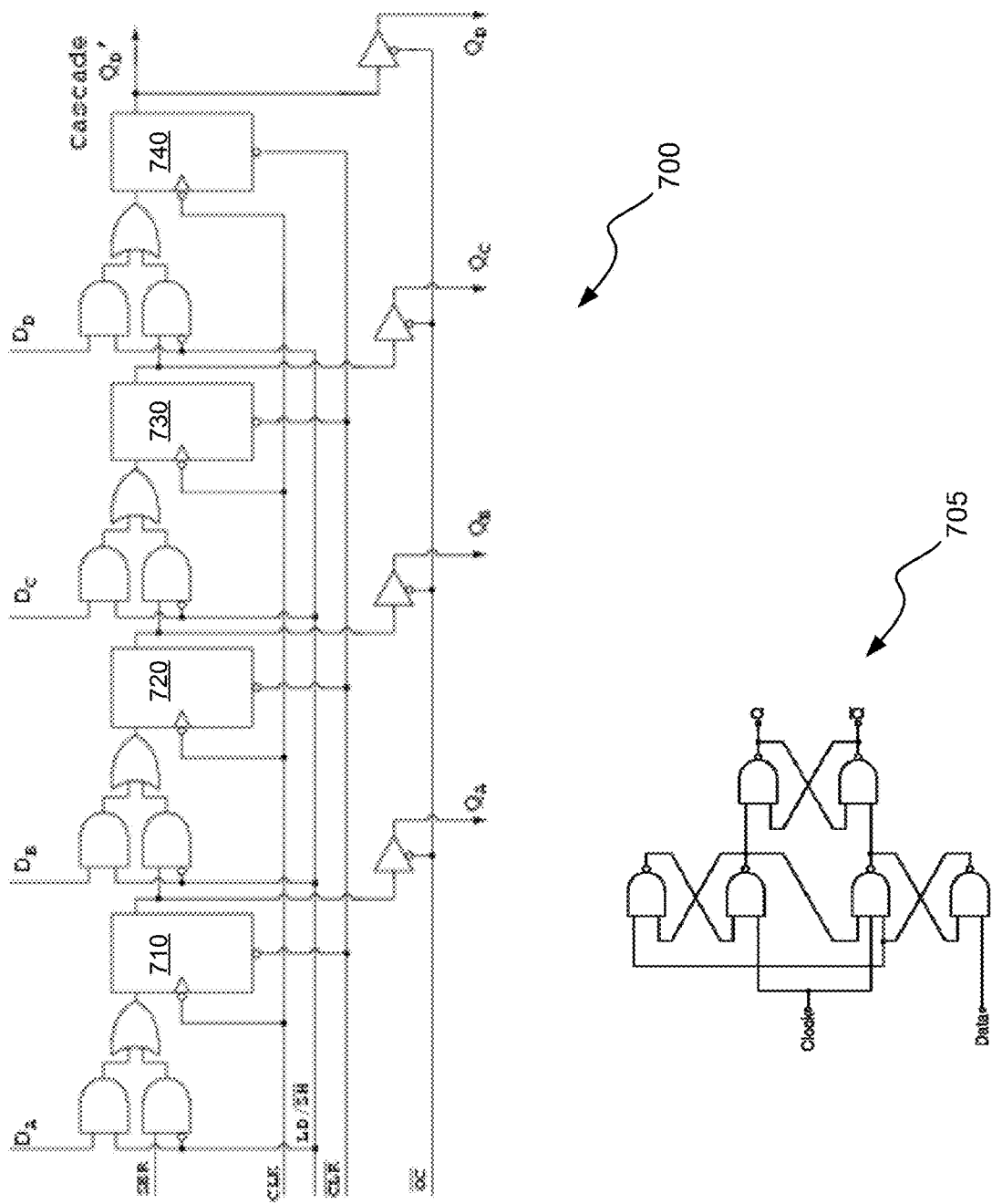
FIG. 7 illustrates an example of a shift register 700 and an example of a flip-flop 705.

FIG. 7 illustrates an example of a shift register 700 and an example of a flip-flop 705. The shift register 700 contains a plurality of flip-flops (cells) 710-740 for storing bits of data and a plurality of AND and OR gates for controlling the mode of inputs: serial or parallel inputs. Each flip-flop contains various logical gates (cells) such as AND gates, as shown by the flip-flop 705. Each logical gate is formed mainly by transistors. Thus, multiple cell instances of the AND gate cell are present on two different levels of the hierarchy design of the shift register. The shift register may itself be a cell in a larger circuit design. FIG. 5 illustrates an example of a hierarchical structure of a circuit design. In the figure, cell A is the root cell, cells C, E and G are leaf cells, and cell B, D and F are composition cells.

The circuit design processed in the operation 420 may use a hierarchical description. The global iterations performed by the voltage propagation unit 310 may comprise propagating voltage values up and down the circuit hierarchy. The subcircuits for which the local iterations are performed by the voltage propagation unit 310 may comprise the root cell, one or more of the composition cells, one or more of the leaf cells, or any combination thereof.

One major reason for using a hierarchical description is to hide the vast amount of detail in a circuit design. By reducing the distracting detail to a single object that is lower in the hierarchy, one can greatly simplify many circuit design/verification operations. The voltage propagation unit 310 may propagate voltage values in a cell for one or more local iterations until voltage values on the nets of the cell become stable (i.e., voltage values on the nets of the cell are not changed from one iteration to the next iteration) or one preset condition is met and then apply the result to instances of the cell that have the same voltage values at the power supply and input ports.

FIG. 5 also illustrates how global and local iterations may be performed according to some embodiments of the disclosed technology. The curved dash lines with arrows represent local iterations while the straight dash lines with arrows represent global iterations. Each of the global iterations includes a propagation up the design hierarchy (illustrated by straight dash lines with arrows upwards) and a propagation down the design hierarchy (illustrated by straight dash lines with arrows downwards). In the propagation up the design hierarchy, the individual cells perform their own local iterations until voltage values on nets within the individual cells are stable. In the propagation down the design hierarchy, voltage values on nets in the cells that are connected to cell input ports are updated with voltage values at the cell input ports.

Referring back to the flow chart 400 in FIG. 4, in operation 440, the voltage analysis unit 320 analyzes the propagated voltage values to detect problems in the circuit design. In some embodiments, the voltage analysis unit 320 compares the propagated voltages and the corresponding components against various electrical or design rules. For example, the voltage analysis unit 320 can determine whether a component, such as a thin-film transistor, receives a voltage in excess of its rating capacity, whether certain components are located within always-on voltage nets, determine whether the circuit design provides adequate spacing between components on different voltage nets, or the like. Additionally or alternatively, the voltage analysis unit 320 may determine whether the circuit design provides adequate spacing between components on different voltage nets by performing a latch-up check, a dielectric breakdown test, or the like.

The voltage analysis unit 320 may also utilize an indication of whether different voltages are synchronized when determining whether the circuit design includes any electrical violations based on the propagated voltages. For example, one type of electrical violation check can compare a minimum voltage of one net versus a maximum voltage of another net, and vice versa, to identify what layout spacing should be between the two nets. When the two nets have a synchronous voltage, however, the analysis by the voltage analysis unit 320 can correspond to a comparison of minimum voltages for the two different nets and a comparison of maximum voltages for the two different nets, which should reduce inaccurate identifications of electrical violations.

Besides finding problems in the layout design, the voltage analysis may help reduce layout spacing requirements for two neighboring features if the voltage differences are relatively low.

In operation 460 of the flowchart 400, the reliability verification tool 300 reports the detected problems in the circuit design. The reporting may comprise storing and/or displaying information of the detected problems. The reliability verification tool 300 (or the graph unit 330) may annotate the graphical representation of the circuit design with indications of electrical violations, for example, which can identify a location of the electrical violations, the corresponding rule prompting the electrical violation, or the like. In some embodiments, the graph display unit 330 may display the annotated graphical representation of the circuit design on a display device.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. One or more non-transitory computer-readable media storing computer-executable instructions that, when executed by a processor, cause a computing system to:

propagate voltage values across components of a circuit design through global iterations until voltage values on nets of the circuit design are not changed from one global iteration to a next global iteration or a maximum number of global iterations are performed, wherein propagation of the voltage values across components of the circuit design through global iterations comprises:
inserting local iterations for a subcircuit of the circuit design into one of the global iterations, the local iterations comprising multiple iterations of voltage propagation for the subcircuit specifically without propagating voltages values for other circuits in the circuit design during the local iterations, and the local iterations suspending when voltage values on nets of the subcircuit are not changed from one local iteration to a next local iteration;
performing the local iterations for a particular instance of the subcircuit in the circuit design to determine resulting voltage values for nets of the particular instance of the subcircuit; and
setting voltage values of nets of other instances of the subcircuit in the circuit design that have same power supply and input port voltage values to resulting voltage values determined from the local iterations performed for the particular instance of the subcircuit; and analyze the propagated voltage values to detect problems in the circuit design; and report the detected problems in the circuit design.

2. The one or more non-transitory computer-readable media recited in claim 1, wherein the local iterations are performed for selected subcircuits of the circuit design.

3. The one or more non-transitory computer-readable media recited in claim 1, wherein the detected problems in the circuit design comprise electrical overstress.

4. The one or more non-transitory computer-readable media recited in claim 1, wherein the propagation of the voltage values through the global iterations and voltage propagation for the local iterations are performed in a vectorless mode in which:

the voltage values for any nets in the circuit design connected to a power supply or ground rail is defined but other nets in the circuit design are undefined; and
the voltage values are propagated across n-type and p-type channels of transistors in the circuit design.

5. The one or more non-transitory computer-readable media recited in claim 4, wherein the propagation of the voltage values through the global iterations and voltage propagation for the local iterations are based on at least one rule assuming transistors are "on" by default.

6. The one or more non-transitory computer-readable media recited in claim 1, wherein the circuit design is in a hierarchical expression, each of the global iterations comprises propagation of voltage values up and down a circuit hierarchy of the hierarchical expression, and the subcircuit is one of a root cell, leaf cells and/or composition cells.

7. A method, executed by at least one processor of a computer, comprising:
propagating voltage values across components of a circuit design through global iterations until voltage values on nets of the circuit design are not changed from one global iteration to a next global iteration or a maximum number of global iterations are performed, wherein propagating the voltage values across components of the circuit design through global iterations comprises:
inserting local iterations for a subcircuit of the circuit design into one of the global iterations, the local iterations comprising multiple iterations of voltage propagation for the subcircuit specifically without propagating voltages values for other circuits in the circuit design during the local iterations, and the local iterations suspending when voltage values on nets of the subcircuit are not changed from one local iteration to a next local iteration;
performing the local iterations for a particular instance of the subcircuit in the circuit design to determine resulting voltage values for nets of the particular instance of the subcircuit; and
setting voltage values of nets of other instances of the subcircuit in the circuit design that have same power supply and input port voltage values to resulting voltage values determined from the local iterations performed for the particular instance of the subcircuit; and
analyzing the propagated voltage values to detect problems in the circuit design; and
reporting the detected problems in the circuit design.

8. The method recited in claim 7, comprising performing the local iterations for all subcircuits of the circuit design.

9. The method recited in claim 7, wherein the detected problems in the circuit design comprise electrical overstress.

10. The method recited in claim 7, wherein propagating the voltage values through the global iterations and the voltage propagation for the local iterations are performed in a vectorless mode, in which:
the voltage values for any nets in the circuit design connected to a power supply or ground rail is defined but other nets in the circuit design are undefined; and
the voltage values are propagated across n-type and p-type channels of transistors in the circuit design.

11. The method recited in claim 10, wherein propagating the voltage values through the global iterations and the voltage propagation for the local iterations are based on at least one rule assuming transistors are "on" by default.

12. The method recited in claim 7, wherein the circuit design is in a hierarchical expression, each of the global iterations comprises propagating voltage values up and down a circuit hierarchy of the hierarchical expression, and the subcircuit is one of a root cell, leaf cells and/or composition cells.

13. A system comprising:
one or more processors, the one or more processors configured to perform a method, the method comprising:
propagating voltage values across components of a circuit design through global iterations until voltage values on nets of the circuit design are not changed from one global iteration to a next global iteration or a maximum number of global iterations are performed, wherein propagating the voltage values across components of the circuit design through global iterations comprises:
inserting local iterations for a subcircuit of the circuit design into one of the global iterations, the local iterations comprising multiple iterations of voltage propagation for the subcircuit specifically without propagating voltages values for other circuits in the circuit design during the local iterations, and the local iterations suspending when voltage values on nets of the subcircuit are not changed from one local iteration to a next local iteration;
performing the local iterations for a particular instance of the subcircuit in the circuit design to determine resulting voltage values for nets of the particular instance of the subcircuit; and
setting voltage values of nets of other instances of the subcircuit in the circuit design that have same power supply and input port voltage values to resulting voltage values determined from the local iterations performed for the particular instance of the subcircuit; and
analyzing the propagated voltage values to detect problems in the circuit design; and
reporting the detected problems in the circuit design.

14. The system recited in claim 13, wherein the local iterations are performed for predetermined subcircuits of the circuit design or all subcircuits of the circuit design.

15. The system recited in claim 13, wherein the detected problems in the circuit design comprise electrical overstress.

16. The system recited in claim 13, wherein propagating the voltage values through the global iterations and the voltage propagation for the local iterations are performed in a vectorless mode, in which:
the voltage values for any nets in the circuit design connected to a power supply or ground rail is defined but other nets in the circuit design are undefined; and
the voltage values are propagated across n-type and p-type channels of transistors in the circuit design.

17. The system recited in claim 13, wherein the circuit design is in a hierarchical expression, each of the global iterations comprises propagating voltage values up and down a circuit hierarchy of the hierarchical expression, and the subcircuit is one of a root cell, leaf cells and/or composition cells.

* * * * *